(12) United States Patent
Sharp

(10) Patent No.: US 11,195,328 B2
(45) Date of Patent: Dec. 7, 2021

(54) 3D MODEL GENERATION SYSTEM AND METHOD

(71) Applicant: CROFTON GROUP LTD, Kent (GB)

(72) Inventor: Jason Sharp, Kent (GB)

(73) Assignee: CROFTON GROUP LTD, Kent (GB)

( * ) Notice: Subject to any disclaimer, the term of this patent is extended or adjusted under 35 U.S.C. 154(b) by 0 days.

(21) Appl. No.: 16/631,625

(22) PCT Filed: Jul. 25, 2018

(86) PCT No.: PCT/GB2018/052091
§ 371 (c)(1),
(2) Date: Jan. 16, 2020

(87) PCT Pub. No.: WO2019/020997
PCT Pub. Date: Jan. 31, 2019

(65) Prior Publication Data
US 2020/0211278 A1    Jul. 2, 2020

(30) Foreign Application Priority Data

Jul. 27, 2017  (GB) .................................... 1712126

(51) Int. Cl.
*G06T 17/05*     (2011.01)
*G06T 7/55*      (2017.01)
(Continued)

(52) U.S. Cl.
CPC ........... *G06T 17/05* (2013.01); *G06Q 50/165* (2013.01); *G06T 7/246* (2017.01); *G06T 7/55* (2017.01); *G06T 2207/10028* (2013.01)

(58) Field of Classification Search
CPC ........... G06T 17/05; G06T 7/55; G06T 7/246; G06T 2207/10028; G06Q 50/165
See application file for complete search history.

(56) References Cited

U.S. PATENT DOCUMENTS

2009/0153685 A1* 6/2009 Son ..................... H04N 5/23216
                                                  348/208.99
2011/0135151 A1* 6/2011 Jang .................... H04N 19/136
                                                  382/103
(Continued)

FOREIGN PATENT DOCUMENTS

WO       2015048434 A1     4/2015

OTHER PUBLICATIONS

Invitation to Pay Additional Fees and Communication Relating to the Results of the Partial International Search, issued in corresponding international application No. PCT/GB2018/052091, dated Oct. 15, 2018.

(Continued)

*Primary Examiner* — Terrell M Robinson
(74) *Attorney, Agent, or Firm* — Day Pitney LLP; Valeriya Svystun

(57) ABSTRACT

Methods, system and devices (10) for generating a three-dimensional (3D) model of a corresponding 3D environment are disclosed. An application is downloaded via a wireless telecommunication module to a mobile device having a sensor set including a depth sensor. A user moves the mobile device freehand to scan the 3D environment. The application controls the mobile device to log data from the sensor set into a raw data file which can be processed to generate a 3D model of the 3D environment.

18 Claims, 1 Drawing Sheet

(51) Int. Cl.
*G06T 7/246* (2017.01)
*G06Q 50/16* (2012.01)

(56) References Cited

U.S. PATENT DOCUMENTS

| | | | | |
|---|---|---|---|---|
| 2012/0262764 | A1* | 10/2012 | Deng | H04N 1/107 |
| | | | | 358/473 |
| 2014/0040653 | A1* | 2/2014 | Etkin | G01V 1/362 |
| | | | | 713/500 |
| 2014/0043436 | A1 | 2/2014 | Bell et al. | |
| 2014/0206443 | A1 | 7/2014 | Sharp et al. | |
| 2016/0360102 | A1* | 12/2016 | Ciudad | H04N 5/23222 |
| 2018/0198976 | A1* | 7/2018 | Upendran | G06T 7/50 |

OTHER PUBLICATIONS

International Search Report and Written Opinion of the International Searching Authority, issued in corresponding international application No. PCT/GB2018/052091, dated Feb. 6, 2019.

\* cited by examiner

3D MODEL GENERATION SYSTEM AND METHOD

CROSS-REFERENCE TO RELATED APPLICATIONS

This application is a U.S. National Stage of International Application No. PCT/GB2018/052091, filed on 25 Jul. 2018 and published on 31 Jan. 2019, as WO 2019/020997 A2, which claims the benefit of priority to UK Patent Application No. GB 1712126.0, filed on 27 Jul. 2017. The content of each of the above referenced patent applications is incorporated herein by reference in its entirety for any purpose whatsoever.

FIELD OF THE INVENTION

The present invention relates to generating a three-dimensional (3D) model of a corresponding 3D environment of the real world. The present invention has particular applicability to the generation of 3D models of building environments, especially internal building environments.

BACKGROUND TO THE INVENTION

Surveyors are tasked with measuring the dimensional properties of building structures, including the boundaries of rooms, hallways and the like. From these measurements, a model of the structure, or part thereof, can be generated and used for the purposes of planning building design, repair or refurbishment.

In many instances, a building surveyor may have limited access to a building to be surveyed, and so key measurements—such as the distance between boundaries of a room—are often taken, and these are later recalled offsite to build a 3D model of an environment. Whilst this approach is adequate for a coarse model of a 3D environment, it does not capture any intricacies of that environment.

More detailed scanning systems employ laser rangefinders which provide accurate measurements of distances. To achieve this, a rangefinder needs to be positioned at a fixed point in space within a 3D environment so that a common frame of reference can be established from which distances can be measured. Whilst such systems are capable of generating very detailed "point clouds" of a 3D environment, they are expensive and required extensive set-up and knowledge to operate. Additionally, measurements taken of a common environment from different locations and perspectives need to be registered with one another.

It is against this background that the present invention has been conceived.

SUMMARY OF THE INVENTION

According to a first aspect of the present invention there is provided a system for generating a three-dimensional (3D) building survey model of a corresponding 3D building environment. The system may comprise a mobile device such as a mobile telecommunication device.

The device may comprise at least one of an electronic screen, a sensor set, a processor, a memory, and a wireless telecommunication module. The electronic screen may be touch-sensitive thereby providing a means by which information can be both transmitted to and received from a user.

The sensor set comprises at least one of a depth sensor, a first image sensor and a localisation unit. Ideally, the localisation unit is an IMU (inertial measurement unit). Each sensor in the sensor set is ideally arranged to generate a respective set of sensor data.

Preferably, the wireless telecommunications module is operable to download an application to the memory. Advantageously, this can confer functionality such as data processing, scanning and 3D model generation to the device which the device (not having the executable application within its memory) would otherwise not have. In other words, the ability of the application to control the device to operate in a new way technically distinguishes it from other devices having the same or similar hardware.

Ideally, the processor is arranged to execute the downloaded application to control the mobile device. Accordingly, the mobile device may be arranged to receive a user command and in response perform a capture routine.

Preferably, the capture routine comprises freehand movement by the user of the mobile device within the 3D environment to be scanned. The capture routine may comprise associating a respective timestamp with sensor data generated by the depth sensor, the first image sensor and/or the localisation unit. The timestamp ideally corresponds to the time at which a respective data set is generated by a respective sensor of the sensor set. Accordingly, the sensor data is time-registered. The time-registered sensor data may be logged to the memory. In doing so, the logged data may form at least a part of a raw data file.

The system may be further arranged to process the raw data file to generate a 3D model of the scanned 3D environment.

Preferably, the sensor data that is generated by the first image sensor is down-sampled prior to being logged to the memory.

Preferably, the system further comprises generating interpolated data that is derived from sensor data. The interpolated data may be associated with an interpolated timestamp.

The interpolated date may be generated to enable time-synchronisation of sensor data from at least two or more sensors of the sensor set of the mobile device.

The interpolated data may be logged to the memory as part of the raw data file instead of the sensor data from which it is derived.

Preferably, the raw data file comprises at least one of:
a time-registered sequence of pose data relating to the position and orientation of the mobile device relative to a reference position as determined from the positional sensor data;
a time-registered sequence of depth map frames as determined from the depth sensor; and
a time-registered sequence of image map frames as determined from the first image sensor.

Preferably, a dynamic model of the 3D environment is generated and updated during the capture routine. The dynamic model may be displayed via the electronic screen to a user as feedback about the completeness of the sensor data logged to the memory.

The electronic screen may be configured to receive a user input to change a view perspective of the dynamic model displayed during the capture routine.

The mobile device may be configured to issue feedback to a user, the feedback comprising instructions relating to how the manual handling of the mobile device can be improved in response to the detected state of the mobile device.

The positional/IMU sensor data may be drift-corrected with reference to non-IMU sensor data.

Preferably, the mobile device comprises a second image sensor configured by the application to receive images of the 3D environment for registration as visual landmarks. The mobile device may be further configured to derive a predicted movement of the mobile device from predetermined changes in the visual landmarks over time. Accordingly, the predicted movement may be applied to drift-correct the positional/IMU sensor data.

The application may control the mobile device to perform a calibration routine prior to the capture routine. The calibration routine may comprise generating a coarse image-position model of the 3D environment which includes visual landmarks for use as an external reference to correct drift.

The system may comprise a reference object having physical properties that are preregistered with the application. Preferably, the identification of the reference object during scanning of the 3D environment can be used to calibrate the sensor data.

The application may control the mobile device to perform a pre-capture routine prior to the capture routine, wherein a sequence of images may be generated from depth map frames outputted by the depth sensor, and these may be displayed on the electronic screen without being stored permanently in the memory.

Naturally, the present invention may extend to a mobile telecommunication device of the system according to the first aspect of the invention.

A second aspect of the present invention may provide a method of generating a three-dimensional (3D) building survey model of a corresponding 3D building environment. The method may comprise at least one of:
- downloading to a memory of a mobile device, ideally via a wireless telecommunication module of the mobile device, an application;
- executing the application ideally using a processor of the mobile device;
- receiving a user command at the mobile device, and in response ideally performing a capture routine.

The capture routine may comprise at least one of:
- moving the mobile device freehand within the 3D environment to be scanned;
- associating a time-stamp with sensor data, for example generated by a depth sensor, an image sensor and/or a positional unit such as an IMU of the mobile device; and
- logging time-registered sensor data to the memory optionally to form at least a part of a raw data file.

Preferably, the logged sensor data and/or raw data file is processed to generate a 3D model of the scanned 3D environment.

A third aspect of the present invention may provide an application suitable for download onto and execution by a mobile device, the application being arranged to carry out a capture routine described in relation to any previous aspects of the present invention.

It will be understood that features and advantages of different aspects of the present invention may be combined or substituted with one another where context allows.

For example, the features of the device or system described in relation to the first aspect of the present invention may be provided as part of the method described in relation to the second aspect of the present invention. Furthermore, such features may themselves constitute further aspects of the present invention. For example, the features and function of the application may themselves constitute further aspects of the present invention. Additionally, features described in the specific description provided hereinbelow may be provided in isolation in aspects of the present invention where context allows.

BRIEF DESCRIPTION OF THE DRAWINGS

In order for the invention to be more readily understood, embodiments of the invention will now be described, by way of example only, with reference to the accompanying drawings in which.

SPECIFIC DESCRIPTION OF THE PREFERRED EMBODIMENTS

Figure 1:
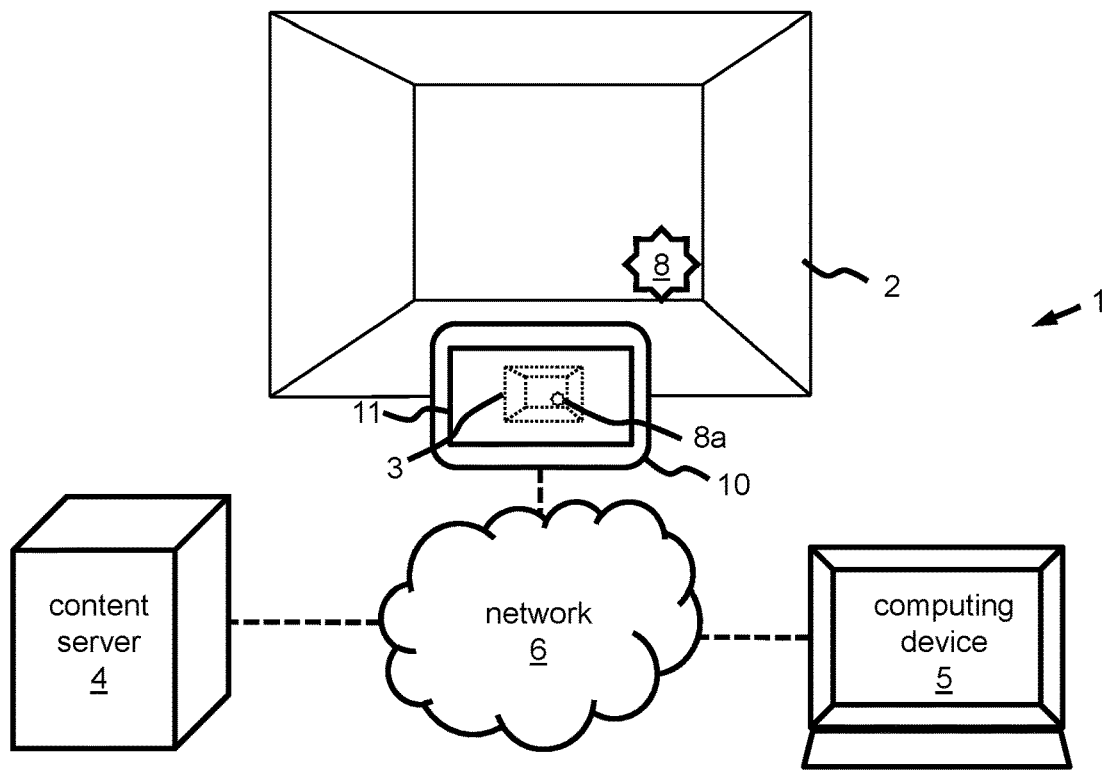
FIG. 1 is a schematic diagram of a system of a first embodiment of the present invention.

FIG. 1 is a schematic diagram of a system 1 of a first embodiment of the present invention. The system 1 comprises a mobile telecommunication device 10 which can be configured to scan a three-dimensional (3D) environment 2 and log data representative of that 3D environment in a raw data file. A 3D model 3 can then be generated from that logged data. The present embodiment is particularly applicable to the scanning and model generation of indoor environments, in particular rooms, hallways and the like. The logged data can be used by the system to generate a 3D model of that environment, the 3D model including information typical of a building survey such as dimension information corresponding to the absolute distances between structures within the 3D environment, as measured by the mobile device 10.

The system 1 further comprises a content server 4, and a computing device 5 which are connected to one another and the mobile device 10 via a communications network 6 such as local area network (LAN), a wide area network (WAN) such as the Internet, or a combination of thereof. The content server 4 may host a content provision platform such as the Apple® Appstore™, or the Google® Play™ Store.

The 3D model 3 may be generated by the mobile device 10 itself. Alternatively, the logged data, in its raw form, can be passed to the computing device 5, and then the computing device 5 may process that data to generate the 3D model. The 3D model may also be converted by the computing device 5 into a variety of formats. For example, the 3D model may be translated into a Building Information Model (BIM) and/or CAD (Computer Aided Design) formats.

Figure 2:
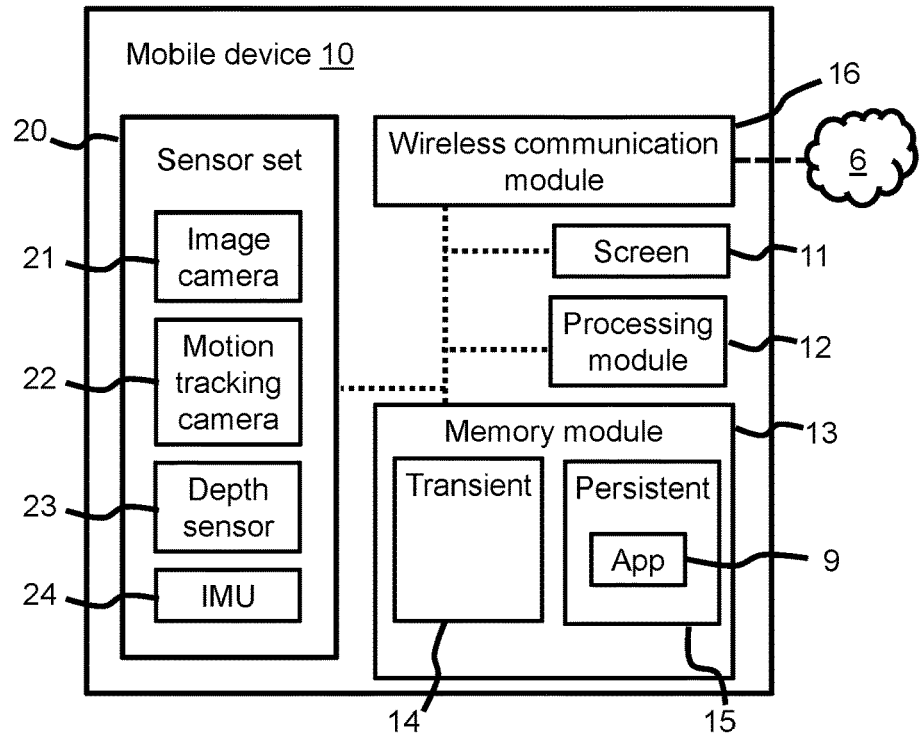
FIG. 2 is a schematic diagram of a mobile device of the system of FIG. 1.

Referring to FIG. 2, which is a schematic diagram of the mobile device 10, the mobile device 10 comprises an electronic touch-sensitive screen 11, a processing module 12 including one or more processors, a memory module 13, and a wireless telecommunications module 16 and a sensor set 20 including a depth sensor 23, a first image sensor 21 for generating images, a second image sensor 22 for tracking motion, and an inertial measurement unit (IMU) 24. The mobile device further comprises other components that are typically common in smart-phone and tablet devices, but are not necessarily shown in the drawings. These other components include, but are not limited to a battery, a timer, audio transducers, tactile transducers (e.g. vibration transducer), a clock, and a GPS positioning device. The components of the mobile device 10 are communicatively linked to one another as schematically indicated by the dotted lines in FIG. 2.

Referring back to FIG. 1, the screen 20 is located on a rear face of the mobile device, and occupies over 80 percent of the surface area of the rear face. The depth sensor 23, the first image sensor 21 and the second image sensor 22 are at the front face of the mobile device 10, which is opposite to the rear face. More precisely, they are arranged so that their respective fields of view extend outward and away from the front face of the mobile device 10 such that they face in an opposite direction to the screen 20. Additionally, the image and depth sensors are positioned and oriented relative to one another so that their respective fields of view overlap.

As the depth sensor 23, the first image sensor 21 and the second image sensor 22 have overlapping fields of view, features of a 3D environment 2 that are resolved by one of these sensors 21, 22, 23 within that overlapping field of view can be mapped to corresponding features resolved by the other of these sensors.

It should be noted that whilst the present embodiment utilises two separate image sensors to separate the function of motion tracking, and image generation, it will be appreciated that in some alternatives it is possible for the one or more functions of the first image sensor to be provided by the second image sensor, and vice-versa. In alternatives, a single image sensor performing the function of both the first and second image sensors may be provided. In further alternatives, a single combined image and depth sensor may be provided.

The memory module 13 comprises a transient memory 14 such as a cache, for transiently storing data such as that generated constantly by the sensor set 20. The memory module 13 further comprises a persistent memory 15 within which an operating system, file system and applications of the mobile device 20 are stored.

The depth sensor 23 comprises an infrared (IR) illuminator which is arranged to project a predetermined pattern of infrared light forwards from the front face of the mobile device 10. Accordingly, the depth sensor 23 further comprises an IR receiver to detect the reflected infrared light from a surface, and utilises properties such as the distortion of the pattern and/or the time of flight of the infrared light in a manner known in the art to determine a distance to a surface.

The functional ability of the device 10 to scan a 3D environment 2 and log representative data is conferred by an application 9 ("app") loaded into the memory module 13 of the device 10 and executed by the processing module 12. This application 9 is acquired from the content server 4. Specifically, the wireless telecommunications module 16 is operable to download an application from the content server 4 into the memory module 13 of the device 10 from which it can be executed by the processing module 12.

When executed, the device 10 is arranged to display on the electronic touch-sensitive screen 11 a graphical user interface (GUI) of the application. The GUI, in use, provides information to, and is arranged to receive input from a user to control the operation of the application, including the initiation and control of routines before, during and after of logging data representative of a 3D environment. These include a pre-capture routine, a calibration routine, a capture routine, and a post-capture routine as will be discussed.

A first routine is a pre-capture routine which is initiated automatically when the application is executed. Providing feedback to a user about data from the depth sensor 23 of the device 10 is particularly useful for the purpose of guiding the user to reliably scan a 3D environment. Accordingly, in the pre-capture routine, data is passed from the sensor set to the transient memory 14. From here the data is retrieved and processed by the processing module 12 for translation into graphical artefacts displayed by the screen 11 of the device 10 to provide real-time "live" feedback to a user of the device 10 about the operation of the sensor set 20.

The depth sensor 23 generates a sequence of depth map frames, each of which contains information on a grid-like arrangement of points in space within the field of view of the depth sensor 23—approximately within a 45 degree viewing frustum in front of the depth sensor 23. Each depth map frame can be translated into a 2D image to be displayed on the screen 11 of the mobile device 10.

The distance between the depth sensor 23 and each of the points in space (which correspond to solid surfaces within the 3D environment) is determined at the moment in time of generation of a respective depth map frame. A depth map frame is generated periodically—for example between 1 to 30 times per second.

Each depth map frame contains, for each point resolved in 3D space, a position value which expresses the position of a respective point in 3D space relative to the depth sensor 23. These may be expressed, for example, in Cartesian (x, y, z) coordinates, wherein (0,0,0) represents a point in 3D space located at the depth sensor itself.

The depth sensor 23, as well as determining the distance to each point in space, also is sensitive to the material from which a particular point on a surface is composed. The present invention uses a depth sensor 23 which utilises the reflectance of infra-red (IR) light to determine the presence of surfaces and distance, and so the IR reflectivity of a particular surface will have an effect on the IR signal returned for a point on that surface. Thus, each depth map frame may also comprise an intensity value for each point in the depth map which corresponds to the reflected intensity of IR light. Certain materials (e.g. glass) have a poor IR light reflectivity, and so will have low or zero intensity values. Lighting conditions can also affect IR reflectivity. Notably, bright light sources such as sunlight, or even lightbulbs have an overexposing effect, blinding the depth sensor, reducing its ability to resolve a distance to an object flooded with light from that light source.

Furthermore, the depth sensor 23 of the present embodiment is substantially impaired in its ability to distinguish between different colours or shades in the visible light spectrum. Accordingly, data generated by the depth sensor is effectively monochrome.

Other shortcomings of known depth sensors such as that of the present invention relate to their optimal operation range. Most have difficulty determining distances to objects greater that 5 metres away, or closer than 0.5 metres from the depth sensor 23.

Accordingly, the depth sensor 23 may generate a depth map frame that includes failure values representative of sub-optimal or failed depth detection. This may be, for example, in respect of points on a surface outside the optimal operation range, and/or on a surface with poor IR reflectivity.

During the pre-capture routine, the application 9 controls the mobile device 10 to display on the screen 11 via a window of the GUI a sequence of images generated from respective depth map frames outputted from the depth sensor 23, and so which are representative of the points in 3D space in front of the depth sensor 23. Points in space that are within an optimal range and which are on surfaces have a better IR light reflectivity are represented in an image displayed by the screen 11 as pixels. These are positioned in an spatial arrangement that corresponds to the position of detected points in space. Moreover, the pixels are shaded with a colour and/or an intensity corresponding to the intensity value of a point within the depth map frame. For example, points on surface having high IR light reflectivity are assigned a higher intensity, and so the pixels representing those points are shaded with a higher intensity of a first colour (e.g. white). Those corresponding to a low IR light reflectivity are shaded a lower intensity of colour. Failure values for certain points in the depth map may be shaded in a contrasting colour to the first colour (e.g. black).

Thus, the screen 11 behaves like a window to the 3D environment 2 and provides feedback to a user about how effectively the depth sensor 23 is able to discriminate surfaces in the 3D environment. Thus, the data from the depth sensor is represented in a way that signals to a user the potential shortcomings of the depth sensor. Accordingly, a user is provided with visual information that is a guide for the use to position and move the device relative to its surroundings to maximise the reliability of data from the depth sensor.

Importantly, the user is provided with this guide prior to a capture operation, and so can be trained for an optimal use of the mobile device without the device wastefully processing data and/or permanently storing it. Notably, data from the depth sensor that is placed into the transient memory 14 during the pre-capture routine is periodically overwritten, and so does not use up storage space on the persistent memory 15.

To reliably capture data about a 3D environment, it is necessary to maintain a common frame of reference (or reference position). The present embodiment provides a mobile hand-held device 10 which, for convenience, is intended to be operated freehand by a user. Accordingly, it is necessary for the mobile device to track its position, orientation and trajectory in 3D space during freehand operation such that a reliable common reference position can be determined and maintained.

This is achieved, in part, via the IMU 24 of the mobile device 10. The IMU 24 comprises an orientation module for determining the orientation of the mobile device in 3D space, and an inertial positioning module for determining the position of the mobile device in 3D space. The inertial positioning module may comprise an accelerometer which detects acceleration and other movement of the mobile device. The IMU 24 can thus be used to infer how the "pose"—i.e. the position and orientation of the mobile device—has changed over time, and so its position relative to preceding detected positional states. Accordingly, a first detected positional state, for example as detected when the application 9 performs the pre-capture routine, can be arbitrarily assigned as the common reference position.

Drift is a common problem that affects devices attempting to self-localise using IMUs. Drift occurs where inaccuracies in the IMU sensor set are compounded over time such that, with extended use, the position of the mobile device relative to its original starting position become progressively less certain and error-prone.

To address this problem, the application is able to use non-IMU sensor data to correct drift.

For example, the application 9 controls the mobile device 10 to perform a second routine, which is a calibration routine, in which data from the second image sensor 22—the motion tracking camera—is utilised to correct drift, by providing additional information concerning the motion, orientation and position of the mobile device. Specifically, the second image sensor receives images of the surrounding environment from which the application 9 determines visual landmarks. The application 9 then calculates drift corrections in response to how those referential visual landmarks change within the field of view of the second image sensor 22. Predetermined image translations of the visual landmarks are predictive of predetermined movement of the mobile device 10. This can be combined with, or augment the data from the other sensors of the mobile device 10 for the purpose of drift correction and reliable self-localisation.

For example, a left-to-right translation in 3D space of the mobile device 10 should correspond to the second image sensor 22 detecting visual landmarks within its field of view to move from right-to-left. Moreover, if a visual landmark corresponds to a physical object that the depth sensor is able to resolve a distance to, then the extent of translation of the visual landmark within the field of view of the second image sensor 22 will be instructive through the use of parallax calculations, in determining how far the mobile device has moved in absolute terms in its left-to-right translation in 3D space.

Similarly, if the mobile device 10 were to carry out a motion which starts and ends at the same position and orientation—for example, if the mobile device were rotated 360 degrees about a vertical axis (yaw), without any substantial variation in pitch, roll, or translational movement within 3D space, then it would be expected that the visual landmarks at the start and end of the motion would be exactly the same.

Accordingly, the application 9 is configured to receive a user command to start the calibration routine. When started, image data frames from the second image sensor 22 are passed to the transient memory 14. The processing module 12, under control of the application 9, retrieves the image data frames and processes them, optionally after applying a filter, to identify image data representative of visual landmarks. In particular, image artefacts of higher contrast than others within the same frame, and/or otherwise being more unique or unambiguously discriminable than others are selected as visual landmarks. Image data not selected as being representative of visual landmarks is discarded, advantageously reducing processing and storage burden of image data from the second image sensor 22. Said selected/filtered image data also has a timestamp associated with it relating to the time of capture of that data by the second image sensor.

The application further queries the transient memory for positional data from other sensors, notably the depth sensor and the IMU, that has been generated substantially at the same time as capture of image data by the second image sensor. This is used to assign positional data to the image data selected as being representative of visual landmarks.

Accordingly, image data, time data and positional data associated with visual landmarks are stored in the persistent memory 15 of the mobile device 10.

The application 9 controls the processing module 12 to detect and to track already-identified visual landmarks, such that image data and positional data for these already-identified visual landmarks can be refined as further data is collected from the second image sensor 22, the IMU 24 and the depth sensor 23. This reduces duplicated information, and assists in improving the existing data set, especially when the field of view of the second image sensor 22 has not substantially changed. This is assisted via the second image sensor 22 having a large field of view, as it is easier to keep track of already-identified visual landmarks. In the present embodiment the second image sensor comprises a fish-eye lens and has a field of view substantially exceeding the first image sensor 21. Nonetheless, the fields of view of the first and second image sensors overlap.

The application 9 is configured to register a change in the position and/or orientation of the mobile device 10 and the field of view of the second image sensor 22 has substantially changed. Accordingly, further images data frames are processed to identify image data representative of further visual landmarks different from those already identified. Notably, the application is configured to determine as many visual landmarks of a 3D environment 2 as necessary to track the motion of the mobile device 10 using image data from the second image sensor 22.

The application 9 is further configured to receive a user command to stop the calibration routine and generate an area description file. This is a coarse image-position model of a 3D environment. This can be used in further scans of the 3D environment 2 to improve the reliability of those scans. Notably, the visual landmarks can be used as an external reference to correct IMU drift, resulting in a lower incidence of real-time error correction on a large data set as generated during a detailed scan.

To further assist the calibration routine and/or a capture routine, the system 1 may comprise a reference object 8 that has physical properties that are preregistered with the application 9. Such a reference object 8 can be placed within the 3D environment 2, and during a scan its presence within the 3D environment 2 can be identified to the application 9. This can be achieved automatically via objection recognition. Alternatively, the reference object 8 may be identified to the application manually by a user by selecting a visual representation 8a of it on the electronic screen 11, and then applying an identification command to select which preregistered reference object it is. As physical properties, such as the dimensions, of the reference object 8 are already registered with the application 9, it can enhance the reliability of scanning, providing another way to calibrate the data generated by the sensor set 20.

The application 9 is further configured to receive a user command to start the capture routine. During the capture routine, data from the sensor set 20 of the mobile device 10 is stored on the persistent memory 15 of the mobile device 10 as a raw data file. The data stored in the raw data file is representative of the scanned 3D environment 2, with the following data parameters provided therein:

Pose: relating to the pose (position and orientation) of the mobile device 10 at a given time, relative to a reference position, as detected by the IMU 24, and as optionally drift-corrected through the use of the second image sensor 22 as described;

Depth: relating to a depth map frame as measured by the depth sensor 23 at a given time; and Image: This relates to an image map frame as measured by the first image sensor 21 at a given time.

Moreover, a sequence of time-registered data sets associated with each pose, depth and image data parameter is stored in the raw data file, and it is from this that a 3D model of the scanned 3D environment can be generated.

In the present embodiment, there is a mismatch between the spatial resolution of the depth sensor 23 and the spatial resolution of the first image sensor 21. The depth sensor 23 has a significantly lower spatial resolution, with each depth map frame containing 320×180 points. The first image sensor 21 is generally able to generate image map frames having a spatial resolution of around 16 megapixel. Accordingly, an image map frame is 250-300 times more detailed than a depth map frame.

Generally, a spatial mismatch of the order of over 100 is typical in most devices presently available. Accordingly, when performing a capture routine, it can be advantageous to store a down-sampled version of the largest possible image map frame to minimise storage burden. This is because during the later use of the raw data file to generate a 3D model of a scanned environment, the spatial resolution of the depth map frames generally set the limit on how detailed that 3D model will be. Whilst image map frames, when paired with a substantially simultaneously-generated depth map frame, can add colour to an otherwise monochrome 3D environment, an image map frame that has not been down-sampled will contain a lot of redundant information.

A down-sampling process that involves the resizing of an image map frame already stored in persistent memory 15 is processor intensive, and so difficult to carry out simultaneously with a capture operation. Accordingly, the application 9 of the present embodiment avoids this difficulty by controlling the processing module 12 to retrieve from the transient memory 14 and store in the persistent memory 15 only a reduced selection of the pixels available from the first image sensor 21. Moreover, the application utilises a selection map which identifies the location of a selection of pixels from an image map frame from the first image sensor 21 which most directly correspond to points of a substantially simultaneously-generated depth map frame from the depth sensor 23. Accordingly, each pixel-point pair is of a common feature of a 3D environment. In other words, the first image sensor view is filtered to display only what the depth sensor is able to view.

Over a capture period, a sequence of data sets for each pose, depth and image data parameter is generated, with each frame having registered with it a time-stamp. Ideally, a common time-stamp would associate each simultaneously-generated data set of pose, depth and image, but in practice there is a temporal mismatch between them. This mismatch may be the result of mismatching frequency and/or phase of data sampling from the transient memory. Nonetheless, the system 1 of the present embodiment may utilise interpolation to adjust the data values associated with one data parameter to better accord to another to correct temporal mismatch.

For example, if a depth map frame is logged at a point in time exactly midway between the time two sequential pose data sets are logged, then a further interpolated pose data set (which is an average of the two sequential pose data sets) can be determined. This can be stored as the interpolated pose data set that is exactly time-synchronised with the depth map frame. The non-synchronised data sets may then be discarded, thereby reducing memory usage.

Depending on the processing capabilities of the device, interpolation may occur in real-time during a capture routine, or alternatively can be performed on the raw data file post-capture. Furthermore, interpolation may be carried out by the mobile device 10, or another member of the system such as the computing device 5.

To maximise the reliability, completeness, and quality of the capture routine, the application 9 is configured to control the mobile device 10 to provide feedback to the user about the status of the capture routine. Primarily, this is via the electronic screen 11, although other ways of providing feedback are possible, for example via audio or tactile (e.g. vibration) transducers provided on the mobile device 10.

In particular, during the capture routine, a dynamic model of the 3D environment being scanned is generated and displayed on the electronic screen 11. Moreover, the model that is displayed on the electronic screen constantly updates to reveal the data captured so far about the 3D environment. As additional data is captured, the model displayed builds in detail and/or size.

The model preferably depicts the scanned 3D environment from a predetermined view, or predetermined set of views. For example, the model could be a plan view and/or an overhead perspective view of the scanned 3D environment. The predetermined view(s) may change over time as the model is updated to allow the user to get useful feedback about the completeness and quality of the data captured. Where multiple views of the scanned 3D environment are provided, preferably a first view depicts the entirety of the 3D environment captured so far, and a second view depicts a detailed view of a part of the 3D environment being captured (for example, a 'live' view corresponding to that which is within the field of view of the depth and image sensors).

Furthermore, the user is able to change the view of the model of the 3D environment during scanning. This can be achieved by the user performing a swipe gesture on the touch-sensitive electronic screen. In response, the application shifts the perspective of the view of the model so far generated in a direction and extent that corresponds to the direction and extent of the swipe gesture. For example, a right-to-left swipe gesture may rotate the view of the model in the same direction about an axis approximately central to the model so far formed.

Further feedback may be provided by instructions displayed via the electronic screen of the mobile device relating to how the manual handling of the mobile device can be improved in response to the detected state of the mobile device. The detected state can be determined from the data values produced by the sensor set 20 of the mobile device 10.

For example, the application 9 may be arranged to issue an instruction to the user to:
 regulate the speed of the scanning operation if it is determined via the accelerometer that the motion of the mobile device 10 is likely to be too quick or too irregular for quality data to be captured via the sensor set 20;
 move closer to or further away from a boundary of the environment, if the depth sensor generates low-confidence or failure values due to a surface being out-of-range;
 orient the mobile device towards a region of the environment determined to have no or poor quality data sets associated with it; and/or
 illuminate an area (e.g. opening curtains, switching on an illumination source, optionally provided by the mobile device);
The instruction may be any one or combination of icon-based (e.g. an arrow), text-based, audio-based, and tactile-based (e.g. issuing a siren and/or vibrating if the mobile device is being moved improperly).

Accordingly, raw data can be reliably collected that accurately represents a 3D environment.

The application 9 is further configured to receive a user command to stop the capture routine, after which the raw data file is made available for post-capture processing.

Post-capture processing can occur on the mobile device 9, or alternatively, the raw data file can be transmitted to another device of the system 1 such as the computing device 5 for post-capture processing. The latter imposes the burden of transmission of data between the two devices, but transfers the processing demands for post-capture processing from the mobile device 10 to the computing device 5. This can be particularly useful in circumstances where it is desirable to preserve the battery life of the mobile device and/or continue using the mobile device 10 for further capture routines. Moreover, a reliable set of models of a set of 3D environments can be more quickly generated and manipulated by a team of users, a first user operating the mobile device, and at the same time, a second user operating the computing device 5.

In either case, it is desirable to convert the raw data file into a more refined format that can be read by CAD or BIM software. The present embodiment envisages the conversion of the raw data file into a format readily readable by Autodesk™ Revit BIM software, but other formats are possible.

The raw data file is generally an aggregation of context-free voxel-based data sets. A general objective of post-capture processing routines involves converting this into a vector-based data sets, and optionally determining and appending additional context information about a building.

To this end, object recognition routines may be applied to identify features of a scanned environment within a building which have contextual properties other than dimensional properties associated with them. For example, the object recognition of a light-source, a light-switch or a socket may indicate the presence of electrical wiring; a sink, toilet or shower may indicate the presence of water feed pipes, and soil pipes; windows may indicate a source of light into a building. These contextual properties can be determined and applied to enhance the use of the 3D model in building visualisation, design, repair and refurbishment.

Similarly, object recognition can be used to enhance a 3D model. If a scanned object has been unambiguously recognised as a predetermined article by an image recognition routine, and the BIM has a pre-generated 3D model of that predetermined article within a model library, then that the pre-generated 3D model of that predetermined article can be substituted into the 3D model of the scanned environment in place of the scan-derived data associated with the scanned object. This is advantageous, as the pre-generated 3D model is capable of being a more precise representation of a scanned object than the scan-derived data. Furthermore, the pre-generated 3D model may impose a lower computational burden than the scan-derived data, for example in storing and rendering an object, as the scan-derived data is generally in a voxel-based form, whereas a pre-generated 3D model can be vectorised.

It should be noted that object recognition routines aren't necessarily limited to image recognition, and can be enhanced through the use of the additional information present in the raw data file. For example, data from the depth sensors can be used to improve image recognition, especially for objects being constructed of materials that have a predictable infrared reflectance. For example, windows are normally constructed of glass which has a very poor IR reflectivity. Accordingly, using a depth sensor to scan a window is likely to return depth map frames having very low confidence or failure values for the glass region of the window. However, using this information in combination with those from the first image sensor 21, and the orientation sensor of the IMU 24 can reliably allow the determination of that region of the 3D environment as being a window. Notably, during daylight hours, windows are generally the source of high levels of light (as detected by the first image sensor), and windows occupy generally vertically-extending planes within a 3D environment (as detected by the orientation sensor). Accordingly, a window object can be confidently recognised.

Whilst the present invention has been conceived to be particularly convenient for the generation of 3D models of environments such as rooms within a building, it will be appreciated that similar techniques can be applied to different contexts, such as generating 3D models of external environments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

The invention claimed is:

1. A system for generating a three-dimensional (3D) building survey model of a corresponding 3D building environment, the system comprising:
a mobile telecommunication device comprising:
an electronic touch-sensitive screen;
a sensor set for generating sensor data, the sensor set comprising a depth sensor, a first image sensor and an IMU (inertial measurement unit);
a processor;
a memory; and
a wireless telecommunications module operable to download an application to the memory;
the processor being arranged to execute the downloaded application to control the mobile device to:
receive a user command and in response perform a capture routine wherein:
a user moves the mobile device freehand within the 3D environment to be scanned;
sensor data that is generated by the depth sensor, the first image sensor and the IMU is each respectively associated with a timestamp corresponding to a time at which that data was generated, thereby time-registering the sensor data; and
the time-registered sensor data is logged to the memory to form at least a part of a raw data file;
the system being further arranged to process the raw data file to generate a 3D model of the scanned 3D environment,
wherein the mobile device is configured to issue an instruction to the user to regulate the freehand scanning movement of the mobile device if it is determined, via an accelerometer, that a motion of the mobile device is ineffectual for the sensor set to generate data that is of a predetermined quality, and
wherein the mobile device is configured to issue an instruction to the user to regulate a speed of the freehand scanning movement of the mobile device if it is determined, via the accelerometer, that the motion of the mobile device is too quick.

2. The system according to claim 1, wherein the sensor data that is generated by the first image sensor is downsampled prior to being logged to the memory.

3. The system according to claim 2, further comprising generating interpolated data derived from sensor data, the interpolated data being associated with an interpolated timestamp to enable time synchronisation of sensor data from at least two of the sensors of the sensor set.

4. The system of claim 3, wherein the interpolated data is logged to the memory as part of the raw data file instead of the sensor data from which it is derived.

5. The system according to claim 1, wherein the raw data file comprises:
a time-registered sequence of pose data relating to a position and orientation of the mobile device relative to a reference position as determined by the IMU;
a time-registered sequence of depth map frames as determined from the depth sensor; and
a time-registered sequence of image map frames as determined from the first image sensor.

6. A system for generating a three-dimensional (3D) building survey model of a corresponding 3D building environment, the system comprising:
a mobile telecommunication device comprising:
an electronic touch-sensitive screen;
a sensor set for generating sensor data, the sensor set comprising a depth sensor, a first image sensor and an IMU (inertial measurement unit);
a processor;
a memory; and
a wireless telecommunications module operable to download an application to the memory;
the processor being arranged to execute the downloaded application to control the mobile device to:
receive a user command and in response perform a capture routine wherein:
a user moves the mobile device freehand within the 3D environment to be scanned;
sensor data that is generated by the depth sensor, the first image sensor and the IMU is each respectively associated with a timestamp corresponding to a time at which that data was generated, thereby time-registering the sensor data; and
the time-registered sensor data is logged to the memory to form at least a part of a raw data file;
wherein the mobile device is configured to provide feedback to a user about a state of the capture routine in dependence on the sensor data; and
wherein the system is further arranged to process the raw data file to generate a 3D model of the scanned 3D environment,
wherein the mobile device is configured to issue an instruction to the user to regulate the freehand scanning movement of the mobile device if it is determined, via an accelerometer, that a motion of the mobile device is ineffectual for the sensor set to generate data that is of a predetermined quality, and
wherein the mobile device is configured to issue an instruction to the user at a time of scanning to regulate a speed of the freehand scanning movement of the mobile device if it is determined, via the accelerometer, that the motion of the mobile device is too quick.

7. The system according to claim 6, wherein a dynamic model of the 3D environment is generated and updated during the capture routine, the dynamic model being displayed via the electronic screen to a user as feedback about a completeness of the sensor data logged to the memory.

8. The system according to claim 7, wherein the electronic screen is configured to receive a user input to change a view perspective of the dynamic model displayed during the capture routine.

9. The system according to claim 7, wherein the mobile device is configured to issue feedback to a user, the feedback comprising instructions relating to how a manual handling of the mobile device can be improved in response to a detected state of the mobile device.

10. The system of claim 9, wherein the mobile device is configured to provide an instruction to the user to illuminate an area of the 3D environment being scanned if it is determined, via the first image sensor, that the area is insufficiently lit for the first image sensor to generate data that is of a predetermined quality.

11. The system of claim 6, wherein the mobile device is configured to provide an instruction to the user to orient the mobile device towards a region of the environment determined based upon data sets associated therewith.

12. The system of claim 11, wherein the mobile device is configured to issue an instruction to a user to move relative to a boundary of the environment, the instruction being dependent on confidence values generated by the depth sensor in respect of that boundary.

13. A system for generating a three-dimensional (3D) building survey model of a corresponding 3D building environment, the system comprising:
   a mobile telecommunication device comprising:
      an electronic touch-sensitive screen;
      a sensor set for generating sensor data, the sensor set comprising a depth sensor, a first image sensor and an IMU (inertial measurement unit);
      a memory, storing an application;
      a processor configured to execute the application to control the mobile device to:
      receive a user command and in response perform a capture routine wherein:
      a user moves the mobile device freehand within the 3D environment to be scanned;
      sensor data that is generated by the depth sensor, the first image sensor and the IMU is each respectively associated with a timestamp corresponding to a time at which that data was generated, thereby time-registering the sensor data; and
      the time-registered sensor data is logged to the memory to form at least a part of a raw data file;
      wherein the system is further arranged to process the raw data file to generate a 3D model of the scanned 3D environment,
      wherein the mobile device is configured to issue an instruction to the user to regulate the freehand scanning movement of the mobile device if it is determined, via an accelerometer, that a motion of the mobile device is ineffectual for the sensor set to generate data that is of a predetermined quality, and wherein the mobile device is configured to issue an instruction to the user to regulate a speed of the freehand scanning movement of the mobile device if it is determined, via the accelerometer, that the motion of the mobile device is too quick.

14. The system according to claim 13, wherein the IMU sensor data is drift-corrected with reference to non-IMU sensor data.

15. The system according to claim 13, wherein the mobile device comprises a second image sensor configured by the application to receive images of the 3D environment for registration as visual landmarks, wherein the mobile device is further configured to derive a predicted movement of the mobile device from predetermined changes in the visual landmarks over time, the predicted movement being applied to drift-correct the IMU sensor data.

16. The system according to claim 13, wherein the application controls the mobile device to perform a calibration routine prior to the capture routine, the calibration routine comprising generating a coarse image-position model of the 3D environment which includes visual landmarks for use as an external reference to correct IMU drift.

17. The system according claim 13, further comprising a reference object having physical properties that are preregistered with the application, an identification of the reference object during scanning of the 3D environment being used to calibrate the sensor data.

18. The system according to claim 13, wherein the application controls the mobile device to perform a pre-capture routine prior to the capture routine, wherein a sequence of images generated from depth map frames outputted by the depth sensor are displayed on the electronic screen without being stored permanently in the memory.

* * * * *